Patented Apr. 4, 1944

2,346,055

UNITED STATES PATENT OFFICE 2,346,055

MANUFACTURE OF GOODS OF OR CONTAINING SPONGELIKE OR CELLULAR RUBBER

Stanley Douglas Taylor, Sutton Coldfield, and Donald Whitworth Pounder, Moseley, Birmingham, England, assignors to Dunlop Rubber Company Limited, London, England, a British company No Drawing. Application December 28, 1940, Serial No. 372,168. In Great Britain January 31, 1940

6 Claims. (Cl. 260—723)

This invention comprises improvements in or relating to the manufacture of goods of or containing sponge-like or cellular rubber or similar materials of the kinds hereinafter specified.

It is known that when rubber latex is subjected under certain conditions to the process of coagulation the fresh coagulum is of a spongy or reticular character and British Specification No. 1,111* of 1914 discloses methods of regulating the pore formation in a simple manner as for example by the addition of ammonium carbonate prior to, during or after coagulation. It has also been proposed to manufacture sponge rubber from latex by mixing organic bases with the latex, adding to this mixture ammonium carbonate in the solid state and heating the coagulum so obtained in order to dissociate the ammonium carbonate. It has further been proposed to make sponge rubber from latex by adding to the latex ammonium carbonate and a vegetable gum jellifiable by borax, gelling the aqueous medium of the thus compounded dispersion by adding borax, decomposing the ammonium carbonate and coagulating the rubber.

The object of the present invention is to provide an improved process permitting the production from rubber latex of sponge-like or cellular rubber of low volume-density.

According to the present invention the process for the production of sponge-like or cellular rubber from aqueous dispersions of the kinds hereinafter specified comprises incorporating in the aforesaid dispersion a gelling agent for rubber dispersions and a substance capable of giving off a gas, effecting gelling of the dispersion under conditions producing a substantially non-porous coagulum and causing liberation of gas from the gas-evolving substance in the thus-gelled rubber dispersion.

The gelling of the dispersion can be effected by the application of heat or can be made to take place in the cold in definite and controllable time intervals. Examples of suitable gelling agents are the alkali silicofluorides, zinc oxide and ammonium salts in combination, one or more non-coagulating substances which decompose or interact on rise in temperature with the formation of one or more acid coagulants, as for instance ammonium persulphate with or without trioxymethylene.

By the term "gelling" is to be understood the conversion of a latex mixing into a uniform coherent coagulum after a time interval at normal or elevated temperature by the addition to the latex of a substance or substances without causing local coagulation.

The liberation of gas can be made to take place concurrently with the vulcanisation of the gelled dispersion, and for adequate inflation of the gel it is important to use temperatures above that of boiling water. Ammonium carbonate is an example of a suitable gas-evolving substance.

Instead of inflating the gelled dispersion by liberating gas from the gas-evolving substance by heat, it has been found preferable to decompose the gas-evolving substance by treating the gelled dispersion with acid. It has been found that the subsequent treatment of, for example, a gelled dispersion of suitable composition and containing ammonium carbonate and sodium silicofluoride with acetic acid leads to the formation of a fine structured uniform spongy mass of low density. Heat may be used to accelerate the action of the acid. Before vulcanisation of the spongy mass it is preferable to neutralise any excess acid by alkali treatment.

The gelling of the dispersion and the subsequent gas-evolving treatment can take place in shaped moulds so that these will gradually become filled with the mass undergoing inflation.

The following examples illustrate the process of the invention:

Example I

Saturated solution of ammonium carbonate _____ml__ 21
An aqueous zinc oxide dispersion (50% concentration) _____ml__ 2
An aqueous sodium silicofluoride dispersion (20% concentration) _____ml__ 10 are added with constant stirring to 100 grams of a latex composition of 55% rubber content and containing the usual vulcanising ingredients. The mixture is poured into a mould of the usual type and allowed to set; the setting is complete after 4 minutes. The mould is then put into a jacketed autoclave with 70 lbs. per sq. in. steam in the jacket. After two hours a spongy vulcanised product is obtained.

Example II

In this example acid is employed instead of heat to generate the gas in the coagulum. A moulded gelled latex coagulum is produced in the manner described in Example I. A quantity of an approximately 8N aqueous solution of acetic acid sufficient to cover the top surface of the coagulum is poured into the mould and the top cover plate of the mould secured in position. The acid solution readily penetrates the coagulum which becomes inflated to a fine-structured uniform spongy mass of low density. It is preferred to accelerate the inflation by warming the mould to a temperature of about 50° C. When the inflation is finished the mould is immersed in a bath of an aqueous solution of ammonia or caustic soda for a few minutes so that the alkaline solution may pass through the spew holes of the mould and neutralise any excess acid. The inflated gel is thereupon vulcanised and dried in the usual manner.

During the gelling of the latex containing sodium silicofluoride in the above examples a certain amount of hydrolysis of the latter substance occurs yielding inter alia hydrofluoric acid. A small amount of gas may therefore be liberated from the ammonium carbonate during gelling but the expansion of the gel by this means is of the order of only 5% of the original volume of latex and the resulting product, having a density of about 0.95, is indistinguishable from non-porous latex rubber. On the other hand the later heat or acid treatment of the gel causes an expansion of the gel which is of the order of 900%.

The emulsions or dispersions comprise those consisting of or containing rubber, gutta-percha, balata or the like material, occurring naturally or artificially obtained and in vulcanised or unvulcanised condition. Aqueous dispersions of coagulated rubber, vulcanised rubber, synthetic rubber, waste or reclaim may also be employed, if desired, as alternatives or admixtures.

Any of the aforesaid dispersions may contain the usual known compounding ingredients. Concentrates such as those obtained according to the processes of Patent No. 1,846,164 and Serial No. 727,530 of July 22, 1924, to which may be added any one or more of the usual compounding ingredients, may also be used.

What we claim is:

1. A process for the production of sponge-like or cellular rubber from aqueous dispersions of the kinds hereinbefore specified which comprises incorporating in the aforesaid dispersion a gelling agent for rubber dispersions and a substance capable of decomposing to evolve a gas on treatment with acid, effecting gelling of the dispersion under conditions producing a substantially non-porous coagulum and treating the thus gelled rubber dispersions with acid.

2. A process as claimed in claim 1 wherein the gelling agent is sodium silicofluoride.

3. A process as claimed in claim 1 wherein the gas-evolving substance is ammonium carbonate.

4. A process as claimed in claim 1 wherein ammonium carbonate is the gas-evolving substance and is decomposed by treating the gelled dispersion with acetic acid.

5. A process for the production of sponge-like or cellular rubber from aqueous dispersions of rubber which comprises incorporating in said dispersion a gelling agent and a substance capable of decomposing to evolve a gas on treatment with acid, pouring said dispersion into a mold, effecting a gelling of the dispersion under conditions producing a substantially non-porous coagulum and covering the surface of said coagulum with an acid and permitting said acid to penetrate into said coagulum.

6. The process of claim 5 in which said acid is acetic acid.

STANLEY DOUGLAS TAYLOR.
DONALD WHITWORTH POUNDER.